May 12, 1953  R. FORTUNE  2,638,307
DIAPHRAGM VALVE
Filed Nov. 22, 1947  3 Sheets-Sheet 1

INVENTOR
R. FORTUNE
By: Fetherstonhaugh & Co.
ATT'YS

May 12, 1953 R. FORTUNE 2,638,307
DIAPHRAGM VALVE
Filed Nov. 22, 1947 3 Sheets-Sheet 2

INVENTOR
R. FORTUNE
By: Fetherstonhaugh & Co.
ATT'YS

May 12, 1953     R. FORTUNE     2,638,307
DIAPHRAGM VALVE
Filed Nov. 22, 1947     3 Sheets-Sheet 3
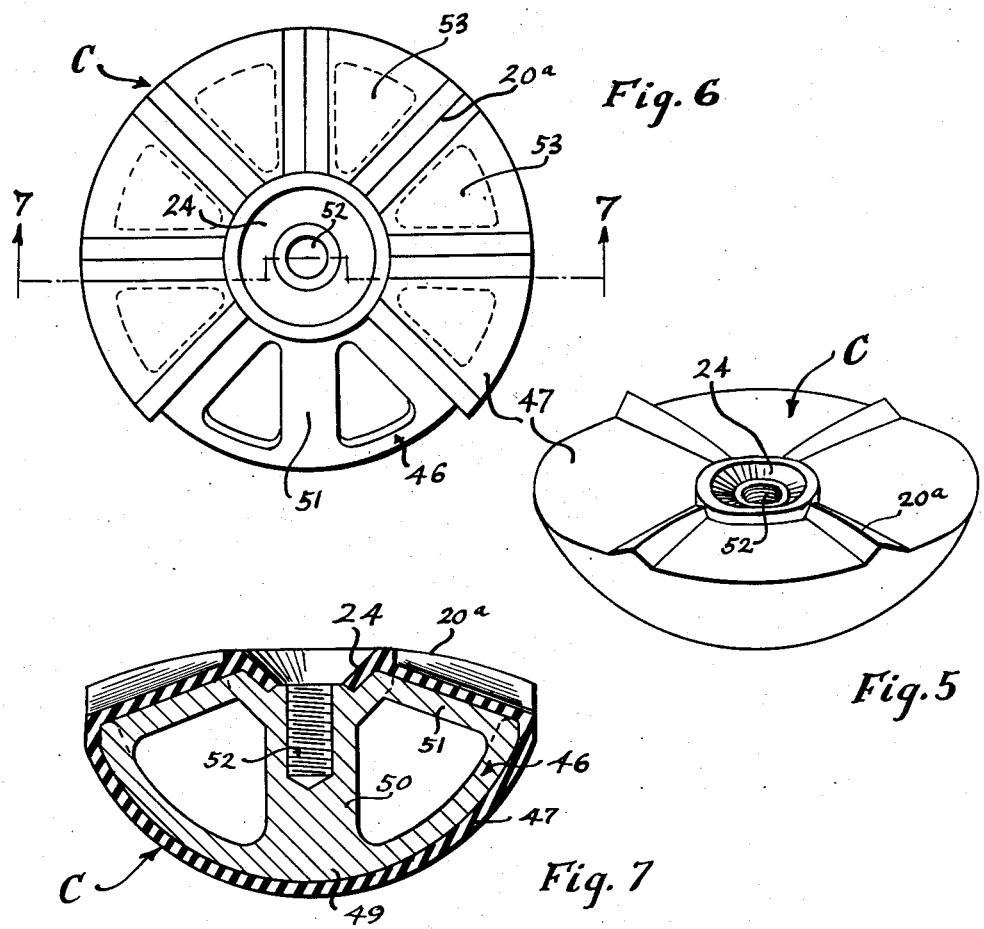
INVENTOR
R. FORTUNE
By: Fetherstonhaugh & Co.
ATT'YS Patented May 12, 1953

2,638,307

UNITED STATES PATENT OFFICE 2,638,307

DIAPHRAGM VALVE

Ronald Fortune, Hamilton, Ontario, Canada

Application November 22, 1947, Serial No. 787,541

9 Claims. (Cl. 251—31)

This invention relates to new and useful improvements in hand wheel operated diaphragm valves employing a flexible or resilient diaphragm particularly for the control of corrosive fluids, and having reference to independent fluid controlling and diffusing valve members, diaphragm supporting means and pressure reducing means.

The prior art has illustrated two general forms of diaphragm valve. (a) The form in which the diaphragm acts as the valve seating and fluid control member. (b) A diaphragm functioning as a sealing member and operating in conjunction with a valve element functioning as the seating and flow control element. Both of these prior proposals have substantial disadvantages in their proposed forms of construction. In the case of the former, wherein the flow control is accomplished without the advantage of an independent valve member, the diaphragm operates directly in conjunction with a transversely disposed weir to control the fluid passing through the valve wherein the weir is an integral part of the valve body and forms a seat for the inner surface of the diaphragm to effect closure. Outward movement of the diaphragm, away from the weir, forms, with the weir, elliptical fluid control orifice, with the inherent disadvantage that the orifice tapers to infinity in the extreme opposite points of the elliptical orifice thus formed, so that minutely restricted areas of the fluid passage are produced which will cause premature wear of the valve, weir seat, and the diaphragm at these points which produces erosion. Furthermore, a further serious disadvantage lies in the fact that the diaphragm is subject to fluttering which produces, to say the least, a further wearing factor.

The second type of valve avoids the particular disadvantages referred to in the case of the first one, but produces other disadvantages by reason of its generally accepted construction.

In my prior United States application Serial Number 514,344, now abandoned, I have disclosed a valve comparable to the second type embodying general improvements in construction and combination which largely offset the disadvantages of the second type of valve of the prior art, such as lack of diffusion of the fluid as it passes through the opened port and consequent erosion of interior parts of the valve body, failure of efficient support to avoid diaphragm flutter, and failure to provide for positive self-centering seating of the valve member.

The present invention incorporates the general improvements of my prior application, and in addition embodies further improvements which operate to increase the efficiency of the valve, comparative to both my prior application and the prior art by embodying a positive and durable seal between the valve member, the diaphragm and the operating ram, an improved means of support for the diaphragm including, a means of facilitating the closing of the valve by incorporating mechanical counterbalance means operating against the pressure from within the valve and an improved means of increasing the supporting surface in contact with the upper surface of the diaphragm throughout the full travel of opening or closing of the valve.

It is, therefore, an object of the present invention to provide a diaphragm valve characterized by a diaphragm which acts as a sealing member only and which co-operates with a valve member disposed between the diaphragm and the valve seat for diffusing and controlling the flow of the fluid through the valve and wherein co-operating parts of the combination will operate in an efficient and improved manner than heretofore.

Another object of the invention is to provide a diaphragm valve of this kind which employs a means for positively locking the diaphragm in the open position, when the valve is open, by sub-tended surface contact and support means operating to eliminate distortion of the diaphragm and flutter, due to vacuum and pulsating pressure conditions.

A further object of the present invention is to provide a valve of this kind which will reduce the effort required at the hand wheel in the closing of the valve by the employment of multiple spring means for exerting residual mechanical compression within the bonnet to provide a balance of pressure against the diaphragm.

A further object of the present invention is to provide a valve of this type characterized by a body employing an inwardly projecting annular flange designed to reduce the area of the diaphragm projected against the fluid pressure from within the valve and acting further to reduce the effort required at the hand wheel when closing the valve against pressure.

A still further object of the invention is to provide a valve of this kind which is of generally simple construction particularly adaptable for general pressure applications by the incorporation of vane members forming part of, and extending radially inward of the bonnet to engage and lock the diaphragm against the valve member when the valve is in the open position and lending to a particularly simple form of construction which facilitates general assembly.

A still further object of the present invention is to provide a valve of this general character incorporating a ram for transmitting to the diaphragm and valve member the operative movement effected by the hand wheel and the inclusion of a simple and positive fluid seal between the lower end of the ram and diaphragm and the upper portion of the valve member and diaphragm.

A still further object of the invention is to provide a diaphragm valve of this kind wherein the vanes within the bonnet are designed to provide guides for a follower plate preferably formed integral with the ram and in particular forming a follower plate of extensive area to support the outer surface of the diaphragm against pressure formed within the valve when closing the valve.

A still further object of the invention is to provide means to engage and lock the diaphragm against the valve member when the latter is in the closed position to relieve the diaphragm against the pressure of the system in which it is employed.

With these and other objects in view the present invention generally comprises a valve structure including a valve body and a bonnet therefor with closure mechanism carried by the bonnet, a substantial part of said mechanism being sealed from the controlled fluid by a resilient diaphragm and wherein the diaphragm is locked against fluttering and distortion due to vacuum and pulsating pressure conditions in the open position of the valve and supported over a maximum area against pressure from within the valve when the valve is closed, including a maximum means of diaphragm support during movement of the valve to and from closed position and a mechanical means for exerting a residual mechanical compression within the bonnet to provide a balance of pressure against the diaphragm for reducing the effort required at the hand wheel to close the valve. Preferably the valve structure includes a slidable ram operable from the hand wheel for actuating the valve parts including a means in combination with the ram and valve member for producing an effective seal between the inner end of the ram member and diaphragm and the outer surface of the valve member and the diaphragm. The valve also preferably includes, as one support for the diaphragm, a follower plate of substantial area preferably formed integral with the lower extremity of the ram and forming a lower support for multiple spring means mounted within the bonnet for exerting said residual compression during closing of the valve. Preferably also the structure includes a stationary support for the diaphragm when in the open position in the form of a plurality of radially extending vanes formed integral with the bonnet of the valve structure.

The invention also embodies improvements in the valve member to improve the operation of the valve structure all of which will be clearly understood by reference to the following detailed specification taken in conjunction with the accompanying drawings.

In the drawings,

Figure 5 is a perspective view of a valve member which may be formed according to the present invention and illustrating the supporting web members on the upper surface.

Figure 6 is a plan view of the top of the valve member with part of the covering cut away to reveal the inner body construction of the valve.

Figure 7 is a transverse section taken through the valve member along line 7—7 of Figure 6 and illustrating more clearly the character of the upper surface of the valve and the rib members which present an upper convex contour.

Figure 1:
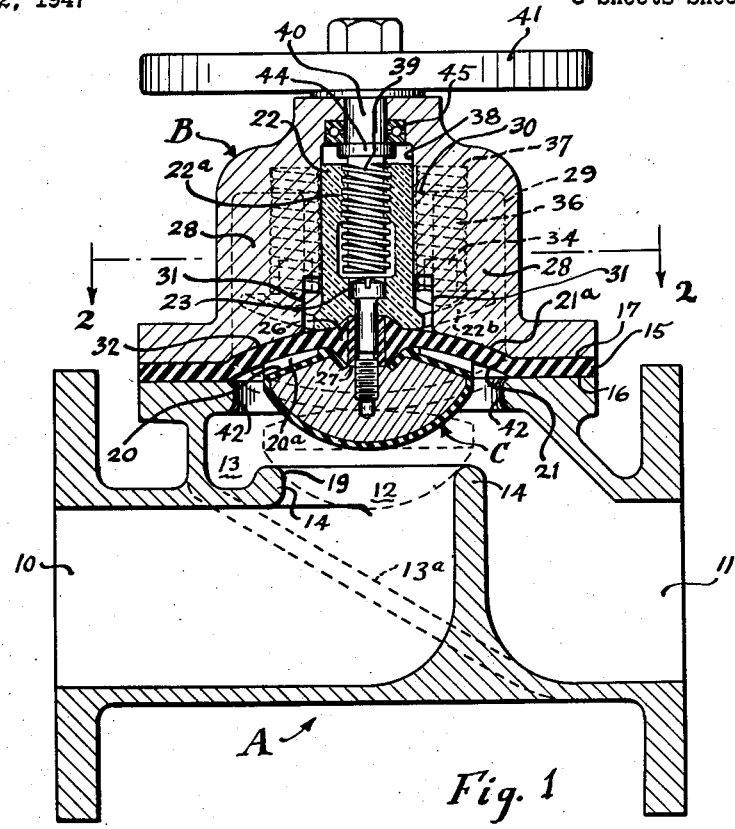
Figure 1 is a longitudinal section taken through the valve structure of the present invention, taken along the central longitudinal axis thereof, showing the valve member in the open position and the diaphragm locked against fluttering and inward movement between the valve member and a plurality of supporting vanes extending from the bonnet.

Referring to the drawings and particularly to Figure 1, the letter A indicates a valve body having an inlet passage 10 and an outlet passage 11 with an intermediate communicating passage 12 therebetween. A chamber 13 is formed in the valve body A and surrounds the nozzle 14 to enclose and define the passage 12. The chamber 13 in turn is defined and enclosed by the flexible diaphragm 15 which is employed as a seal isolating the bonnet B from the valve body A and clamped between the flanged surfaces 16 and 17 of the body A and bonnet B respectively, the assemblage being held together by suitable bolts 18. Fluid control is effected by means of a valve member C, the latter being mounted inwardly of the diaphragm 15, centrally of the passageway 12, and being designed to move towards or away from the valve seat 19.

The valve member C has an upper convex surface 20 designed to mate with the inner surface 21 of the diaphragm 15 when the valve is in the open position. This surface may be designed to engage the diaphragm but preferably, contact with the diaphragm is effected through a plurality of radially disposed ribs 20a to be referred to in detail later on.

The valve member C in a preferred construction is mounted from the slidable ram 22 by means of the screw 23 which passes through an orifice at the base of the partially screw threaded bore 22a of the ram and enters into threaded engagement with the valve member C. In this connection, the valve member and the ram are formed with the female cone components 24 and 25 respectively, and the screw 23, therefore, operates to lock oppositely projecting co-axial male component cones 26 of the diaphragm 15 therein, as shown, to form a co-axially opposed double union joint concentric with the central axis of the ram and valve member. A pressure limiting bushing 27 surrounds the screw 23 in this central union area designed to prevent the diaphragm from being injuriously compressed but ensuring a perfect fluid seal of particularly simple character and wherein the double union connection is fully protected by the base of the ram and the upper central area of the valve member C.

Figure 2:
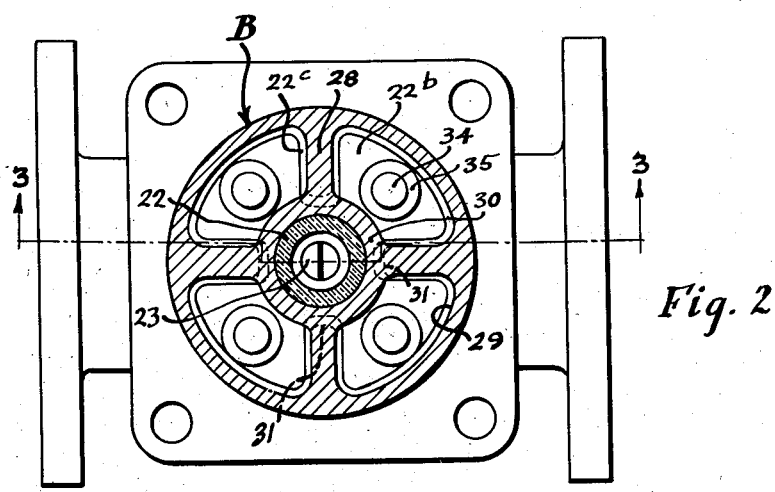
Figure 2 is a transverse section taken through the valve bonnet along the line 2—2 of Figure 1.

An important feature of the invention is embodied in the construction of supporting vanes 28 designed for the support of the diaphragm in the open position of the valve, which vanes are integrally cast with the bonnet B and radially project from the inner surface of its wall 29 as clearly shown in Figure 2. At their inner ends, the vanes are integrally connected with the guide cylinder 30 in which the ram 22 is designed to slide during operation of the valve to and from closed position. The vanes 28 also function to strengthen the cylinder 30 and can be formed with the bonnet in a simple, practical casting. The lower extremities of the vanes 28 are curved to conform with and support the outer surface 21a of the diaphragm when the valve is in the open position (Figure 1), thus forming a cradle for the diaphragm in this position of the valve. Moreover, when the valve is open it will be clear that the diaphragm 15 will be held firmly locked between the lower ends of vanes 28 and the upper convex surface 20 or ribs 20a of the valve member C, therefore completely avoiding any possibility of fluttering in the diaphragm or collapse of the same due either to pulsating pressure or vacuum conditions arising within the valve body.

The diaphragm is designed to be supported against pressure from within the valve body A during its closed position and its movement to and from closed position by means of a follower plate 22b which is preferably formed integral with the ram 22 and designed to constitute a circumferential projection extending radially from the lower end of the ram 22. The follower plate 22a is provided with a series of radially extending narrow slots 22c in effect to straddle the vanes 28 and permit free movement of the plate 22b relatively thereto. The area of the plate intervening said slots 22c substantially corresponds to the cross-sectional area of the bonnet between the vanes 28 so that the follower plate 22b constitutes a support for the diaphragm such that it will contact a major area of the diaphragm which, therefore, particularly in the closed position of the valve is supported substantially throughout its entire area. The lower surface of the follower plate 22b is substantially convex, designed to mate with the concaved upper surface 21a of the diaphragm when the valve is in the closed position. Moreover, it will be appreciated by a consideration of Figures 1 and 3 that the diaphragm 15 is supported against pressure from within the valve body in a maximum manner throughout the range of movement of the diaphragm, as the valve member C travels from the fully closed position to fully open position, because the outer extremities of the contacting face of the follower plate 22b only start to disengage from the surface 21a of the diaphragm 15 after the valve member C has been unseated and at this point such areas of the diaphragm commence to engage with the radially outermost supporting surface of the vanes 28 while the convex upper surface of the valve member C commences to engage the under-surface 21 of the diaphragm. Accordingly, therefore, there is but little variation in support of the diaphragm in the intermediate stages between the fully closed position and the fully open position, whereas during the more hazardous period for possible distortion of the diaphragm, i. e. movement of the valve towards closed position, the diaphragm is given the large area support of the follower plate 22b. The vanes 28, of course, in combination with the slots 22c in the follower plate 22b, act to prevent rotation of the follower plate and the ram during the movement of the latter as the valve is actuated from closed to open position and vice versa.

Figure 3:
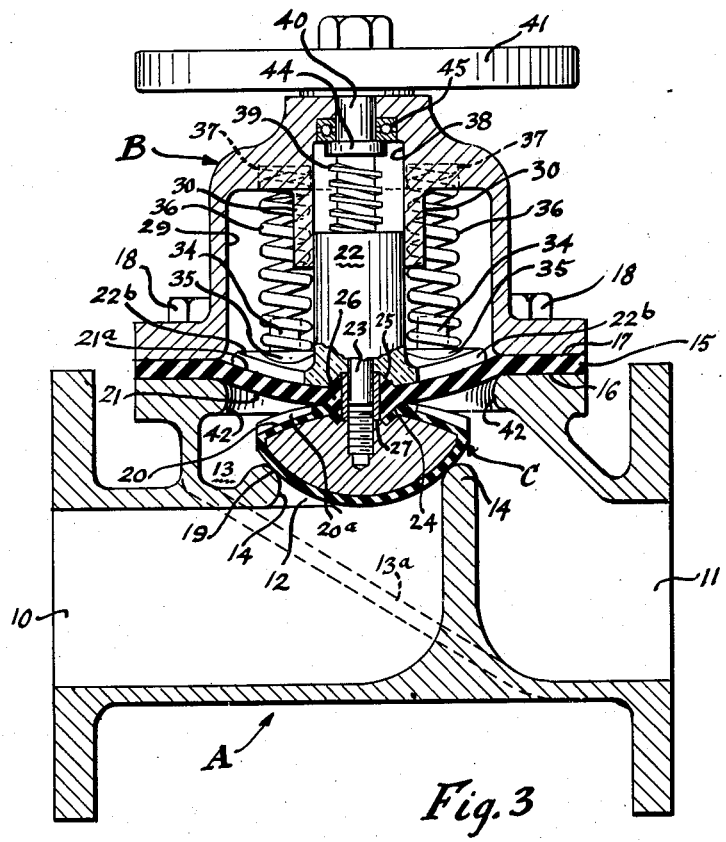
Figure 3 is a longitudinal section similar to Figure 1 but taken along the line 3—3 of Figure 2 but with the valve member in the closed position and showing more clearly the counterbalancing pressure spring means in the bonnet and the ram end follower plate carried thereby.
Figure 4:
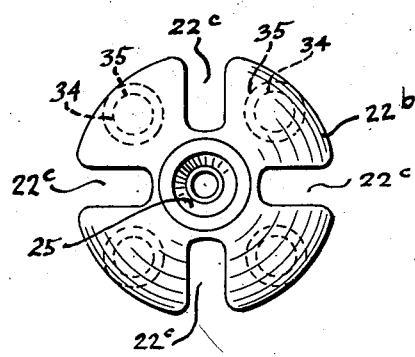
Figure 4 is a plan view of the follower plate to illustrate its construction and area more clearly.

On reference to Figure 2 it will be noted that the rearward surface of the follower disc, i. e. the webs which are formed in effect between the slots 22c, are provided with the pins 34 extending outwardly therefrom substantially at right angles thereto, each carrying a collar or shoulder 35 and being designed to accommodate helical compression springs 36 which engage the shoulders 35 at their lower extremities and the recesses 37 formed in the top of the bonnet B, as shown in Figures 1 and 3. The ram 22 is slidable in the bore 38 of the guide cylinder 30, the threaded poriton thereof being designed for threaded engagement with the thread 39 and the spindle 40 of the valve, which thereby assures alignment of the ram in its movement between the extreme open and extreme closed position of the valve and prevents binding of the spindle. This lends to a smooth operation of the valve which is supplemented in the case of closing of the valve where extra effort is usually required at the hand wheel, by means of the compression springs 36 which act to reduce substantially, thrust load between the threads of the spindle 40 and the ram 22 and exert a residual mechanical compression within the bonnet to provide a balance of pressure against the diaphragm in the closing operation of the valve.

A further means of reducing the effort required at the hand wheel 41 in closing the valve against pressure is provided by the inwardly projecting annular ring or inwardly projecting flange 42 of the valve body designed inwardly to subtend the inner surface 21 of the diaphragm adjacent to its periphery in effect, therefore, to reduce the total area of the inner surface of the diaphragm projected against the pressure of fluid from within the valve thereby reducing the total pressure against the diaphragm in direct proportion to the reduction of exposed surface area, i. e. by the direct ratio R2 to r2.

The resultant upward thrust is transmitted through the collar 44 to the thrust bearing 45 of the bonnet B. When the pressure developed within the valve results in an upward force equal and opposite to the combined downward force of the compression springs, the effort required at the hand wheel 41 to close the valve is thus reduced to that of frictional resistance only in the mechanism involved.

The valve member C comprises a rigid core 46 which is covered with an impervious coating 47 which serves as a non-abrasive cushion. The covering 47 is preferably a resilient material which is impervious to a fluid carrying abrasive solids in suspension of corrosive fluids. The member C may, of course, be moulded in a solid piece from a suitable acid resisting material but the preferred embodiment of the valve element C is illustrated in Figures 6 and 7. Thus the rigid core 46 is cast in the form of a cage being comprised of a continuous spherical segment 49 in its lower portion, the central hub 50 and spider arms 51 extending inwardly from the segment 49 to the hub 50 as revealed in Figure 7. Thread means 52 in the hub are designed to mate with the thread of the screw 23 to mount the member C in the body of the valve. The covering 47 is coated on the core and extends upwardly to form ribs as at 20a above each spider member 51 of the core. Thus it will be observed that between the ribs 20a webs 53 of resilient covering material are formed between the spider members and may be subject to considerable flexure. Thus when the ribs engage the diaphragm 15 of the valve a plurality of radially extending orifices are formed adjacent the inner surface of the diaphragm. This construction serves as an adequate support for the diaphragm against vacuum and also provides for drainage of the denser particles that may tend to settle between or adhere to the upper surfaces of the valve member C and the inner surface of the diaphragm. Moreover, the flexible webs 53 are capable of flexing inwardly to accommodate materials that might adhere to and build up on the upper surface of the valve member, when the valve is in the open position and will reflex on opening of the valve to expel the trapped material into the fluid thereby effectively avoiding any tendency to clog in this area of the valve.

In the open position, the lower spherical portion of the valve member C converges concentrically into and towards the annular seat 19, depending on the degree of opening, thus to serve as a diffuser for the impinging fluid from the orifice 12 and thereby prevent erosion of the seat 19 and premature wear of the diaphragm surface 21 by effecting a smooth annular area of quiescent distribution of the impinging fluid throughout the chamber 13 and into the downward and self-draining spillway 13a to converge into a smooth confluent stream at the outlet 11.

From the foregoing it will be appreciated that I have produced an improved diaphragm valve structure employing a flexible diaphragm which may be adapted particularly for the control of corrosive fluids, wherein the diaphragm is protected against deterioration, from pressure forces of the fluid within the valve, and wherein the diaphragm employed may readily be formed from inert plastic materials since the diaphragm is accordingly protected against deterioration even though the plastic substance which may be employed lacks pliability. Of course, the diaphragm may be formed from any practical, flexible material and which may be chosen to suit the requirements for which the valve is designed to be employed. It will be obvious, of course, that apart from the particular means of supporting the diaphragm, the combination and arrangement is such as to further obviate wear and erosion of the diaphragm, since the semi-spherical seat engaging surface of the valve located inwardly of the diaphragm in combination with the spillway acts to diffuse the impinging fluid uniformly into the spillway as described, which further acts to prevent erosion of the valve seat, whereas the reduced flexing area of the diaphragm will also play a part in preventing premature wear of the latter. Finally, the simple, practical seal produced between the ram, diaphragm and valve member and the counterbalancing spring assembly operate to further increase the practical efficiency of the valve.

Some variations, of course, could be made within the principle of the invention and it will, therefore, be understood that the foregoing disclosure should not be construed in a sense more limiting than the scope of the appended claims.

What I claim as my invention is:

1. In a diaphragm valve which includes a valve body and a bonnet having a diaphragm sealing the bonnet from the body, said diaphragm being clamped at its marginal edges and at its centre, means for supporting the diaphragm against inward displacement and fluttering due to vacuum and the like when the valve is open, comprising a valve member positioned concentrically with and inwardly of the diaphragm, said valve member having ribs extending radially and upwardly therefrom and defining the upper convex contour of the valve member, said ribs being designed to engage said diaphragm when outwardly moved and the valve member is unseated thereby to support the diaphragm from inward flexing movement and fluttering.

2. In a diaphragm valve which includes a valve body and a bonnet having a diaphragm sealing the bonnet from the body, said diaphragm being clamped at its marginal edges and at its centre, means for supporting the diaphragm against inward displacement and fluttering due to vacuum and the like when the valve is open, a valve member including a body having a semi-spherical seat engaging surface located inwardly of the diaphragm, and ribs extending upwardly from the valve member and convexly disposed to form means engageable with the diaphragm when said valve member is unseated for supporting said diaphragm against inward flexing movement.

3. In a diaphragm valve employing a diaphragm as a sealing member, and a valve member operable therewith to control the flow of fluid through the valve, said valve member comprising, a body having a semi-spherical seat engaging surface located inwardly of the diaphragm and substantially convex upper ribs, said convex upper ribs forming means engageable with the diaphragm when said valve member is unseated for supporting said diaphragm against inward flexing movement, said valve member being hollow and covered with a resilient covering, said valve member having resilient webs in its upper surface to provide inwardly flexible areas of the covering, the latter accommodating solid or semi-solid particles tending to lodge between the valve member and the diaphragm, said area reflexing, when said valve member is moved in a direction away from the diaphragm, to urge such particles from the area between the valve member and the diaphragm.

4. In a diaphragm valve employing a diaphragm as a sealing member and a valve member operable therewith to control the flow of fluid through the valve, said valve member comprising, a body having a semi-spherical seat engaging surface located inwardly of the diaphragm, and substantially convex upper ribs extending upwardly from said valve member, said convex upper ribs forming means engageable with the diaphragm when said valve member is unseated for supporting said diaphragm against inward flexing movement, said valve member being hollow and covered with a resilient covering, said valve member being formed with webs in its upper surface to provide inwardly flexible areas of the covering, the latter accommodating solid or semi-solid particles tending to lodge between the valve member and the diaphragm, said webs reflexing, when said valve member is moved in a direction away from the diaphragm, to urge such particles from the upper surfaces of the valve member.

5. In a diaphragm valve employing a diaphragm as a sealing member, and a valve member operable therewith to control the flow of fluid through the valve, said valve member comprising a body having a semi-spherical seat engaging surface located inwardly of the diaphragm and substantially convex upper ribs, said convex upper ribs forming means engageable with the diaphragm when said valve member is unseated for supporting said diaphragm against inward flexing movement, said valve member being hollow and covered with a resilient covering to form resilient webs between said ribs, said valve member being provided with a plurality of radially disposed channels bounded by said upper ribs and the webs of said valve member and accommodating solid or semi-solid particles tending to lodge between the valve member and the diaphragm, said webs reflexing, when said valve member is moved in a direction away from the diaphragm, to urge such particles from the upper surface of the valve member.

6. A valve assembly comprising a follower plate, a diaphragm and a valve member, said diaphragm having a free flexing area with a central hole surrounded by projections on the inner and outer surfaces thereof, said follower plate and valve member having centrally disposed cavities on the surfaces adjacent said diaphragm adapted to mate with said projections, said valve member having a resilient surface in contact with said diaphragm at the central clamping region therebetween the surface of said follower plate adjacent said diaphragm extending outwardly from the marginal edge of said follower plate cavity and gradually diverging towards the outer edge thereof to define a support the outward radial extent of which substantially corresponds to the outward radial extent of the free flexing area of the diaphragm, means extending from said follower plate through the hole in said diaphragm to said valve member for holding the assembly in coaxial compression to form a leakproof seal, and means for limiting the compression on the central portion of said diaphragm.

7. An assembly in accordance with claim 6 including a rigid collar inserted in said diaphragm hole as the means for limiting the compression on the central portion of said diaphragm.

8. A valve assembly comprising a follower plate, a diaphragm and a valve member, said diaphragm having a free flexing area with a central hole surrounded by projections on the inner and outer surfaces thereof, said follower plate and valve member having centrally disposed cavities on the surfaces adjacent said diaphragm adapted to mate with said projections, the surface of said follower plate adjacent said diaphragm extending outwardly from the marginal edge of said follower plate cavity and gradually diverging towards the outer edge thereof to define a support, the outward radial extent of which substantially corresponds to the outward radial extent of the free flexing area of the diaphragm, and a screw, the head of which fits loosely within a recess in said follower plate and abuts against a counterbored shoulder in said recess, passing freely through the central hole in said diaphragm and being threaded into a tapped hole in said valve member to hold the assembly in coaxial compression to form a leakproof seal.

9. In a diaphragm valve, a cylindrical-shaped bonnet mounted on a body, said body and bonnet having matched circular openings with a flexible diaphragm clamped therebetween at its margins, a fluid chamber forming part of said body and covered by said diaphragm, an inwardly directed by imperforate flange defining said body opening and overhanging said chamber, said opening being of smaller cross-sectional area than said chamber thereby to decrease the fluid-exposed area of said diaphragm by an amount equal to the subtending area of said inwardly directed imperforate flange, the inner cross-sectional area of said bonnet being substantially the same as that of said body opening, the means for clamping the diaphragm between said bonnet and body openings being a plurality of bolts passing through holes, in said body and bonnet and in the marginal portion of said diaphragm, located outside the area of said inwardly directed flange.

RONALD FORTUNE.

References Cited in the file of this patent

UNITED STATES PATENTS

| Number | Name | Date |
|---|---|---|
| 349,758 | Solano | Sept. 28, 1886 |
| 754,186 | Arendt | Mar. 8, 1904 |
| 1,385,681 | Hammond | July 26, 1921 |
| 1,612,567 | Browne | Dec. 28, 1926 |
| 1,647,823 | Antisell | Nov. 1, 1927 |
| 1,891,133 | Bahnson | Dec. 13, 1932 |
| 1,983,106 | Sundstrom | Dec. 4, 1934 |
| 1,990,635 | Buttner | Feb. 12, 1935 |
| 2,000,542 | Wasson | May 7, 1935 |
| 2,027,859 | Cohen | Jan. 14, 1936 |
| 2,377,227 | Griswold | May 29, 1945 |

FOREIGN PATENTS

| Number | Country | Date |
|---|---|---|
| 3,642 | Switzerland | of 1891 |
| 19,787 | France | of 1857 |